Patented Mar. 10, 1942

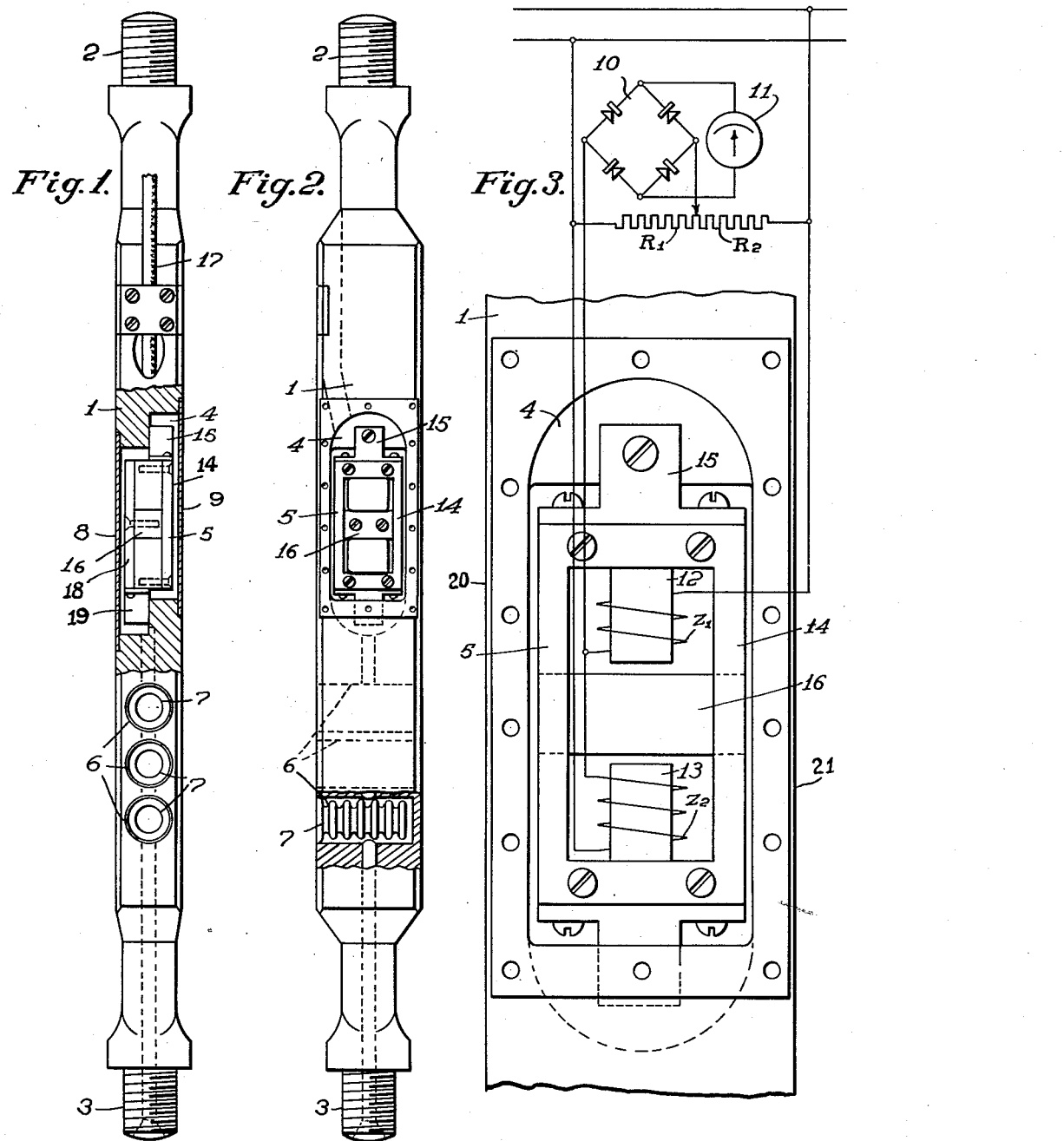

2,275,532

UNITED STATES PATENT OFFICE 2,275,532

OIL WELL STRAIN GAUGE

Edward H. Lamberger, Wilkinsburg, and Bernard F. Langer, Pittsburgh, Pa., assignors to Westinghouse Electric & Manufacturing Company, East Pittsburgh, Pa., a corporation of Pennsylvania Application April 18, 1939, Serial No. 268,500

4 Claims. (Cl. 265—1)

Our invention relates to a submersible strain gauge suitable for use in oil well pumping equipment.

In the study of oil well pumping equipment, use has been made of mechanical and electrical strain gauges to measure the force transmitted through the polished rod. The record of this force, varying with respect to time or crank position, has been used to calculate forces in the parts of the pumping rig which are above the ground, but cannot be used reliably to calculate load conditions in the string of sucker rods or at the pump inside the well, due to such characteristics of the equipment as elasticity of rod string, friction, and crookedness of hole. Valuable information could be obtained from an instrument which could record the actual force at any point in the string of sucker rods.

An object of our invention is to provide a strain gauge which may be positioned within a string of sucker rods extending below the ground surface and by which the load at any point in the string of rods may be measured and indicated or recorded above ground.

Another object of our invention is to provide a strain gauge which is completely enclosed so that it may be submerged in the well liquid, and may be so positioned and constructed that it will give an extremely accurate determination of the stress or force occurring in the rod string where it is mounted.

Other objects and advantages will become apparent from a study of the following specification when considered in conjunction with the accompanying drawing, in which:

Figure 1 is a side view, in partial cross section, of our invention;

Fig. 2 is a front view of the device illustrated in Fig. 1, in which the cover plates for the strain gauge chamber have been omitted; and Fig. 3 is a partial front view of the strain gauge including a schematic showing of its associated metering circuit.

Referring to Figs. 1 and 2, numeral 1 denotes the main body of the device or rod which has screw threaded ends 2 and 3 to which "sucker" rods may be attached. A chamber 4 is provided by drilling, machining or otherwise, in an intermediate portion of the device or rod 1. Within chamber 4 is mounted a magnetic strain gauge element 5. Communicating with chamber 4 are a number of expansible chambers 6 each enclosing a flexible bellows 7 preferably made of copper. Inasmuch as the strain gauge 5 is completely enclosed and sealed from the outside atmosphere by cover plates 8 and 9, it will be noted that the bellows 7 form a flexible closure element primarily for the purpose of equalizing the pressure contained within the various chambers with that of the medium surrounding the rod. Such surrounding medium may be that of air or liquid in which the device is operating. Thus, it will be observed that the pressure equalization not only prevents leakage through the closure but prevents distorting of the strain gauge which would result in erroneous indications thereby. A body of clean oil is provided in the chamber 4 and is sealed therein by the respective closure members. By enclosing the magnetic strain gauge element, it will be protected from dirt, crude oil and salt water.

Since the strain gauge is mounted on the center line of the device, the effects of bending of the rod in any plane are negligible.

Referring now particularly to Fig. 3, the magnetic strain gauge comprises essentially an electrical bridge having a pair of resistance or impedance arms $R_1$ and $R_2$ and a pair of impedance arms $Z_1$ and $Z_2$. Unbalanced currents in the bridge are conducted through the copper oxide bridge type of rectifier 10 to a meter 11. The impedances $Z_1$ and $Z_2$ are, in effect, coils mounted on laminated iron cores 12 and 13, respectively, which cores are mounted on a frame 14. The frame 14, in turn, is mounted on a lug 15 which, in turn, is rigidly secured to the upper portion of the device 1 above chamber 4. Mounted to a portion of the device below chamber 4 is a laminated iron armature 16 secured to a frame 18. The frame 18 in turn, is mounted on a lug 19 which, in turn, is rigidly secured to the lower portion of the device 1 below chamber 4.

The string load or pumping load is carried essentially by two columns 20 and 21 of the device, which columns mechanically parallel the magnetic strain gauge. Any load applied to the string at the point of location of the device will cause a corresponding and proportionate change in length of the columns of the device, which, in turn, causes a corresponding movement of the armature 16 in the air gap between coils 12 and 13. Therefore, if a tension load occurs at the device, the air gap between core 13 and armature 16 will decrease whereas that between core 12 and armature 16 will increase, thereby changing the reluctance of the magnetic paths and consequently changing the impedance of the two coils 12 and 13. This will cause an unbalance in the electrical bridge. Therefore, a current will pass through meter 11 which is in proportion to the movement of armature 16, and will, therefore, be proportional to the strain and stress at the device. When rod 1 is subjected to compressive forces, armature 16 will move upwardly relative to impedances $Z_1$ and $Z_2$ and will again cause an unbalance in the bridge and a deflection of the pointer of meter 11 to an extent determined by the load applied.

Meter 11 may be an oscillograph or, in fact, any of the various types of indicating or recording instruments, or both.

A cable 17 carrying the lead-in conductors for the magnetic strain element is led into the device through a narrow notched portion in the device, as clearly shown in Figs. 1 and 2. The cable is also sealed in a fluid-tight manner to parts of the rod into which it is conducting.

The device, or a number of devices located along and in the string of sucker rods, is electrically connected to surface apparatus by suitable electrical cable.

It will thus be seen that the meter or recording instrument 11, which is situated above the surface of the ground, will readily give a record of variations in the load. Also, one or more of these devices may be connected in the rod string giving a simultaneous record of load variations at several points in the rod string, including one near the pump, inside the well. These loads may be correlated to position of the polished rod or any connected surface equipment, at any instant. Thus it will be possible to correlate at any instant forces occurring in the subsurface equipment with those occurring in the surface equipment.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made.

We claim as our invention:

1. In combination, a rod for use in oil well pumping equipment, said rod being provided with a chamber within said rod at an intermediate portion of said rod, a rugged magnetic strain gauge within said chamber including an armature and a core having a coil mounted thereon, which armature and core are respectively connected to spaced points of said rod which points move relative to each other in response to stretching of said rod as the result of tension applied thereto, closure means for completely sealing said chamber and magnetic strain gauge, and including a flexible diaphragm secured to said rod and bodily contained within the confines of said rod and in communication with said chamber for equalizing the pressure within said chamber with that of the atmosphere surrounding said rod, said chamber containing a body of oil surrounding said magnetic strain gauge.

2. In combination, a rod for use in oil well pumping equipment, a chamber within said rod at an intermediate portion of said rod, a rugged magnetic strain gauge including an indicating device, an electrical bridge having two resistance arms and two impedance arms, two pole-pieces in said chamber said impedance arms only being contained within said chamber in the form of two coils wound on said pole-pieces, and an armature, said pole pieces and armature being respectively connected to spaced points of said rod which are adapted to move relative to each other to cause unbalance of said bridge as the result of tension or compression of said rod due to load being applied thereto, closure members for completely sealing said chamber and magnetic strain gauge, including flexible bellows members secured to said rod and bodily contained within the confines of said rod and in communication with said chamber for equalizing the pressure within said chamber with that of the atmosphere surrounding said rod, said chamber containing a body of oil contained within said chamber and sealed therein by said closure members including said flexible bellows members.

3. In combination, a rod for use in oil well pumping equipment, said rod being provided with a chamber disposed axially within said rod at an intermediate portion of said rod, a rugged magnetic strain responsive device within said chamber including a pair of spaced coils fixedly disposed on laminated cores and a laminated armature disposed between said coils, alternating-current means outside of said coils for energizing said coils, said armature and coil cores being connected respectively at spaced points to said rod whereby variations in distance between the points of connection cause a movement of the armature away from one coil toward the other or toward one coil and away from the other depending upon whether the connecting points move toward each other or away from each other, whereby the relative impedance of said coils is altered, means outside of said chamber for measuring the variations in impedance to thus determine the variations in tension of the rod, circuit connections remote from said chamber connecting said coils to said measuring means and said coil-energizing means, said circuit connections having lead-in wires which are provided with a seal at the point of entry into said chamber, closure means for sealing the chamber, said chamber containing a liquid, and flexible bellow members secured to said rod and bodily contained within the confines of said rod and in communication with said chamber connected to communicate at one side with the liquid in the chamber and at the other side with the atmosphere, whereby the pressure in the chamber is equalized with the pressure of the fluid outside the chamber.

4. In combination, a rod for use in deep-well pumping equipment, said rod being provided at a suitable point along its length with a chamber, closures for the chamber to positively close the chamber against leakage of any liquid into or out of the chamber, said chamber being filled with a liquid, a frame in the chamber connected to the rod, substantially on the axis of the rod, at one end of the chamber, spaced laminated pole-pieces mounted on the frame, a second frame in the chamber connected to the rod, substantially on the axis of the rod, at the other end of the chamber, a laminated armature disposed between the pole-pieces mounted on the second frame, whereby elongations of the rod cause relative movements of the armature and pole-pieces, said rod also being provided with additional chambers in communication with each other and with said first mentioned chamber, pressure equalizing diaphragms disposed within said additional chambers and contained within the confines of said rod to equalize the fluid pressures between the inside and outside of the chamber, and electrical measuring means responsive to relative movement of said pole pieces and armature for indicating the elongation of said rod.

EDWARD H. LAMBERGER.
BERNARD F. LANGER.